Figure 1:
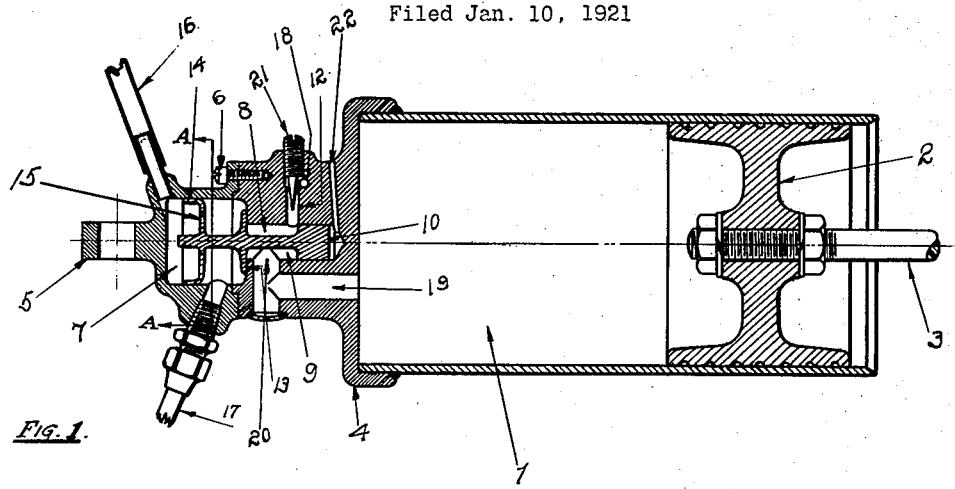

Jan. 27, 1925.

H. E. MOREHOUSE

AUTOMATIC SHIFTING MECHANISM

Filed Jan. 10, 1921

1,524,634

SECTION A-A

INVENTOR
Harold E. Morehouse
BY H. L. Walker
ATTORNEY

Patented Jan. 27, 1925.

1,524,634

UNITED STATES PATENT OFFICE.

HAROLD E. MOREHOUSE, OF DAYTON, OHIO, ASSIGNOR OF ONE-HALF TO JOHN H. SHEATS AND ONE-HALF TO CHARLES P. HARDING, BOTH OF DAYTON, OHIO.

AUTOMATIC SHIFTING MECHANISM.

Application filed January 10, 1921. Serial No. 436,247.

*To all whom it may concern:*

Be it known that I, HAROLD E. MOREHOUSE, a citizen of the United States, residing at Dayton, in the county of Montgomery and State of Ohio, have invented certain new and useful Improvements in Automatic Shifting Mechanism, of which the following is a specification.

My invention relates to pneumatically operated controlled gages for automatically shifting mechanical elements, such as automatically setting or releasing clutch elements, moving steering mechanisms, or performing other shifting movements under the influence of variations of fluid pressure.

The object of the invention is to simplify the structure as well as the means and mode of operation of such control devices, whereby they will not only be cheapened in construction, but will be more efficient in use, positive in action, uniform in operation, easily controlled and unlikely to get out of repair.

While the present invention has been shown in the drawings and will be described, as applied to the clutch operating lever, of an automotive vehicle, it is to be understood that the invention is not limited to such application, but may be applied to other pedal or control levers of an automobile, or to the control levers of an aeroplane, to the steering and control mechanism of motor boats, or torpedoes, and other analogous applications, as well as to the shifting of clutches and the setting and operation of automatic machinery in factories.

The object of the invention is to provide an improved form of valve mechanism, actuated by variations of fluid pressure, preferably though not necessarily air pressure, by which a piston may be controlled and actuated in its reciprocatory movement. In the application of the invention illustrated in the drawings, the particular object is to automatically control the connection and disconnection of the driving clutch of an automobile, independent of pedal manipulation, whereby when the throttle valve is opened, the clutch is allowed to gradually and uniformly engage, thereby starting the vehicle without shock and without straining the mechanism, and upon the closing of the throttle valve, as by lifting the operator's foot from the accelerator pedal, the present mechanism will automatically disconnect the clutch. By this means the vehicle is controlled solely thru the throttle, preferably by means of the accelerator pedal. This is a great convenience, particularly when driving in cities, in congested traffic, where it is necessary to stop and start frequently. Moreover, many drivers fail to use discretion in the connection of the clutch mechanism, by permitting the clutch element to engage suddenly and forcibly thereby causing the machine to start suddenly with great strain upon the parts, and destructive action upon the tires. The present device is so constructed as to automatically govern the engagement of the clutch parts whereby they will engage slowly and uniformly without consideration by the driver.

With the above primary and other incidental objects in view as will more fully appear in the specification, the invention consists of the features of construction, the parts and combinations thereof and the mode of operation or their equivalents as hereinafter described and set forth in the claims.

Figure 2:
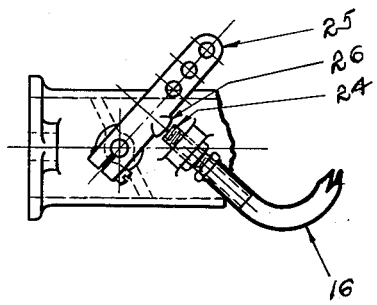
Figure 4:
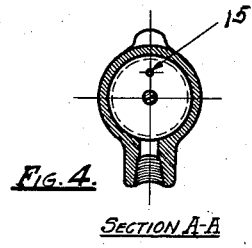
Figure 3:
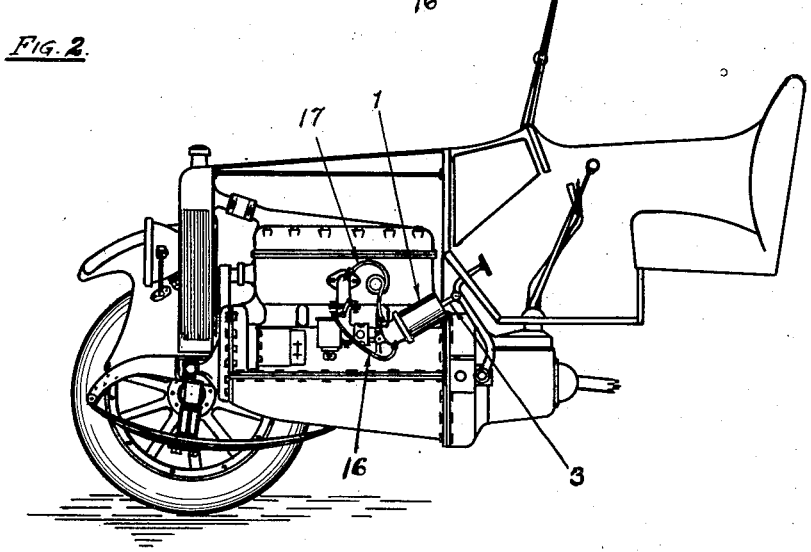

Referring to the drawings, Fig. 1 is a longitudinal sectional view of the assembled pneumatic control apparatus forming the subject matter hereof. Fig. 2 is a detail view of the throttle control device. Fig. 3 is a sectional view of the forward portion of a motor vehicle illustrating the application of the present invention to the clutch control lever thereof. Fig. 4 is a detail sectional view thru the valve housing of the mechanism.

Like parts are indicated by similar characters of reference thruout the several views.

In the preferred, but obviously, not the only embodiment of the invention, the apparatus comprises a cylinder 1, having therein a reciprocatory piston 2, operatively connected with the member to be actuated of whatever character such member may be, by a piston rod 3. In the present instance, the member to be actuated, comprises the clutch pedal or lever of an automobile. As commonly constructed at the present time, the driving clutch elements of a motor vehicle are spring actuated into operative engagement, while the pedal or lever is employed to disengage such elements, against the tension of their spring. This being a common and well known feature of automobile construction, has not been illustrated in the drawings, inasmuch as the clutch construction per se forms no part of the present invention. However, the present control mechanism is adapted to actuate the clutch pedal or control lever against the tension of its spring to disengage the clutch elements, and to automatically govern the reengagement of the clutch element under the influence of the clutch spring, controlling the retractive movement of the control pedal. The cylinder 1 is provided at its opposite end with a head 4, within which is contained the control valve mechanism, and by which the cylinder is pivotally mounted to enable it to accommodate itself to the differential movements of the control pedal. To this end the head 4, is provided with an ear 5 to be pivoted on the engine or upon the frame of the vehicle.

For convenience of manufacture and assembly, the head 4 of the cylinder is formed in separable parts, interconnected by the screws 6. This separable head contains a valve chamber with which communicates a longitudinal bore 8. Mounted to reciprocate within the chamber 7 and the bore 8, is a reciprocatory valve stem 9, having at its inner end within the bore 8, a head 10 forming a piston valve, which controls an air inlet port 12, communicating with the bore 8. At a medial point in its length the valve stem 9, carries a disc-like valve head 13 coacting with a valve seat about the mouth of the bore 8, to close said bore when the valve stem is at the inner limit of its movement, at which time the piston head 10 uncovers the air inlet port 12. At its outer end, within the chamber 8, the valve stem carries a piston head 14, separating the chamber 8 into two compartments, intercommunicating one with the other thru a bleed hole 15, within the piston head 14. The chamber 8 upon the outer side of the piston head 14 communicates with atmosphere thru an air inlet conduit 16, preferably having some source of control valve or other means for opening and closing the air inlet duct 16, whereby the admission of air to the chamber 8 on the outer side of the piston head 14, will be intermittent. Communicating with the chamber 8 on the inner side of such head 14, is an exhaust conduit 17, leading to any type of vacuum inducing, or suction means. In the present instance, the exhaust conduit 17 leading from the chamber 8, at the inner side of the piston head 14, communicates with the intake manifold of the internal combustion motor of the vehicle. The action of the motor pistons within the cylinder, thus tends to induce a suction thru the manifold and exhaust conduit 17, thereby exhausting the chamber 8, and inducing a partial vacuum therein. It will be obvious that as the chamber 8 is exhausted upon one side of the piston head 14, and the air inlet duct 16 is open to atmosphere, the atmospheric pressure upon the outer side of the piston head 14 will tend to move the piston head, and with it the valve stem 9 inwardly, to the position shown in Fig. 1. This tends to seat the valve 13 against the end of the chamber 8, and so close the bore 8. This movement of the valve stem 9, shifts the head of the piston valve 10 beyond the air intake port 12, allowing air at atmospheric pressure to enter thru the duct 18, and thence thru the port 12 to the bore 8, which bore 8 communicates with the interior of the cylinder 1, thru a passage 19, having a port 20 into the bore 8. The air inlet duct 18 being comparatively small, and the flow of air being further controlled by adjustment of the tapered head of the screw plug or needle valve 21, which control the capacity of the port 12, the admission of air to the cylinder 1 will be gradual. This will permit a slow but uniform retraction of the piston 2, under the influence of the clutch operating spring, which tends to retract the clutch member, and the control pedal, to which the end of the piston rod 3 is connected. By the gradual admission of air to the cylinder, the engagement of the clutch member is governed. If the air inlet duct 16 be now closed to prevent the entrance of atmospheric air to the chamber 7, the exhaustion of the chamber 7, thru the exhaust conduit 17 under the influence of the motor suction, will not only exhaust the air from the inner side of the piston head 14, but will also exhaust the air from the outer side of the piston head thru the bleed hole therein. Upon the exhaustion of the chamber 7 on both sides of the piston head 14, and decrease of resistance to movement, the air at atmospheric pressure within the cylinder 1, previously admitted thereto, thru the inlet port 12, will exert an outward pressure upon the disc valve head 13, causing the valve stem 9 to shift longitudinally thereby opening the valve 13 and closing the air inlet port 12 by the retraction of the piston valve head 10. To enable the free movement of the valve stem, and prevent the entrapment of air within the end of the bore 8, this bore 8 is provided with a vent duct 22, leading to atmosphere, thru which air may enter or escape with the reciprocatory movement of the piston valve head 10. The outward movement of the valve stem and the opening of the valve 13 due to atmospheric pressure within the cylinder 1, when the chamber 7 is exhausted, opens communication between the chamber 7 and the cylinder 1, thru the port 20 and passage 19, whereby the interior of the cylinder 1 is exhausted, thru the exhaust conduit 17. It will be understood at this time that the intake port 12 is closed by the head 10. Upon the exhaustion of the cylinder 1, atmospheric pressure upon the outer side of the piston head 2 will tend to force it inwardly, thereby retracting the pedal or other lever against the tension of its spring. As a convenient method of controlling the air inlet duct 16, this duct has been shown in the drawings, as leading to a point in proximity to the throttle control lever of the carburetor. It is the common practice to provide an adjustable stop screw, for the throttle lever to limit its throw. In the present instance, this stop screw 24 is shown provided with a central bore, with which the air inlet 16 communicates. The throttle lever 25 is provided with a boss or enlargement 26, preferably faced with a pad of leather, felt or other suitable material, which will contact the end of the perforated screw 24 to close the longitudinal passage therethru, when the throttle is in its retracted or closed position. Thus whenever the throttle is retracted or closed, no air can enter the valve chamber 7, and hence the chamber will be exhausted thru the conduit 17, the air passing from the outer side of the piston head 14 thru the bleed hole 15. This exhaustion of the chamber 7, and consequent reduction of resistance, enables the valve 13 to be opened under the influence of atmospheric pressure within the cylinder 1, thereby bringing the cylinder 1 under the influence of the exhaust conduit 17, which by the exhaustion of the air from the cylinder effects, the retraction of the piston 2. On the contrary, the opening of the throttle valve no matter how slightly the movement will be, will open the ducts thru the stop screw 24, and then thru the air inlet duct 16, permitting air at atmospheric pressure to enter the chamber 7, on the outer side of the piston head 14, thereby returning the valve head and valve 13 to closed position, inasmuch as there will at this time be a partial vacuum within the cylinder 1, and upon the inner side of the piston 14. This movement of course opens the air inlet port 12, and air at atmospheric pressure will rush into the cylinder 1 permitting the piston 2 to be retracted under the influence of the clutch spring.

It is the common practice to provide motor vehicles with both foot and manual control means for the throttle. The manual means is usually a finger operated lever upon the steering wheel segment. In the event that it is desired to render the apparatus inoperative, as for instance, for the purpose of maintaining the clutch in engagement, to use the resistance of the engine for breaking purposes, when descending hills, it is only necessary to move the manual throttle control lever, one or two notches upon the segment thereby maintaining the lever 25 out of contact with its stop screw 24. This will maintain the air inlet duct 16 at all times open, and air will be supplied to the chamber 7, thru the duct 16, more rapidly than it can be exhausted thru the bleed hole 15. Hence the valve 13 will be maintained closed, and the cylinder 1 open to atmosphere thru the port 12, and inlet duct 18.

In any event the clutch control lever is always capable of manual or pedal operation. Upon foot pressure upon the pedal, to overcome the tension of the clutch spring, the pedal may be depressed to disengage the clutch element, at which time the piston 2 will move idly within the cylinder 1. In such event the air within the cylinder will be discharged by the movement of the piston thru the passage 19 and port 20, the increased pressure within the cylinder 1, due to the movement of the piston, under the influence of the driver's foot pressure upon the pedal being sufficient to unseat the valve 13, thereby permitting such air to escape thru the exhaust conduit 17, while a small portion of it may escape thru the bleed hole 15 and the air duct 16, providing the throttle arm 25 is not firmly seated on the stop screw 24 at such time. However, even though the control mechanism may be inoperative so far as it pertains to the retraction of the clutch pedal and the disengagement of the clutch element against the tension of the spring, upon the release of pressure from the accelerator pedal, it will nevertheless exert a governing influence upon the return movement or retractive action of the clutch lever, under the influence of its spring to insure the gradual and uniform engagement of the clutch element. This is due to the fact that the clutch pedal may return only with the retraction of the piston head 2, which in turn will be controlled by the rapidity with which air is admitted to the cylinder 1, thru the air inlet port 12. The capacity of the port 12 may be regulated by the adjustment of the pointed screw plug or needle valve 21, to permit the air to enter more or less rapidly, and hence effect the operative engagement of such elements more quickly.

While at the present time the invention will probably find a wider field of usefulness in the control of clutch levers, of automobiles as illustrated in the drawing, it is obvious that the piston rod 3 may be connected to the elevator control lever or rudder control lever of an aeroplane to maintain the plane upon even keel, or in a predetermined line of flight, automatically returning it when moved therefrom by manual effort, or it might be connected with the rudder control mechanism of a motor boat or a torpedo. In the latter instance, the duct would be controlled by a gyroscopically operated valve, opened and closed by the deviation of the torpedo from a direct path of travel, as is very commonly used and well known. In such application, the exhaust conduit 17 would be connected to a vacuum tank or chamber, previously exhausted.

While for illustrative purposes the invention has been shown and described in association with the main clutch of an automobile, it is to be understood that in lieu of connecting the piston rod of the apparatus to the clutch lever, it may be connected with the gear shift lever of the motor vehicle for the purpose of automatically shifting the transmission gears upon the opening and closing of the port 16 by a manually operated control device or by other means.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In an automatic control device, the combination with a movable member to be actuated having a retractive tendency, a cylinder, a piston therein operatively connected with the movable member to be actuated, an exhaust passage and an automatic fluid pressure operated valve alternately connecting said cylinder with atmosphere and with said exhaust passage, whereby the piston is reciprocated to effect the movement of the control member against its retractive tendency by atmospheric pressure, and the movement of the actuated member under its retractive tendency is permitted by the equalization of the pressures on opposite sides of the piston.

2. An automatic control device of the character wherein a movable member having a retractive tendency is actuated and controlled by the reciprocation of a fluid pressure operated piston, within a cylinder, characterized by a reciprocatory control valve, an exhaust conduit to the cylinder and a supply port for fluid under pressure alternately opened and closed by the movement of the valve, an actuating diaphragm controlling the movement of the piston, said diaphragm being subjected to fluid pressure on one side and to a partial vacuum on the other side, a bypass connecting the opposite sides of the diaphragm and means for interrupting the supply of fluid under pressure to the pressure side of said diaphragm whereby the pressure upon opposite sides of the diaphragm may equalize thru said bypass to permit the movement of the valve by pressure within the cylinder, said valve being returned by unequalized pressure upon said diaphragm upon the subsequent admission of fluid pressure thereto.

3. An automatic control device of the character wherein a movable member having a retractive tendency is actuated and controlled by the reciprocation of a fluid pressure operated piston, within a cylinder, characterised by an exhaust conduit leading from the cylinder and a supply conduit for fluid under pressure leading thereto, a control valve therefor, a movable diaphragm actuating the valve subjected to fluid pressure upon one side and a partial vacuum upon the other side to move said valve under the influence of such fluid pressure, and means for equalizing the pressure on opposite sides of said diaphragm whereby the valve is permitted to move under the influence of fluid pressure within the cylinder.

4. In an automatic control device, the combination with a movable member to be controlled normally tending to move in opposition to the influence of the control device, of a cylinder and a piston therein, operatively connected with the controlled member, of a vacuum chamber, a movable diaphragm therein, separating the chamber into two compartments inter-communicating one with the other thru a bleed hole, an exhaust conduit leading from the vacuum chamber at one side of the diaphragm, an air inlet port to the chamber at the opposite side of the diaphragm, means for controlling said air inlet port to vary the diaphragm by variation of air pressure thereon and valve means controlled by the movement of the diaphragm opening said cylinder to atmosphere when the diaphragm moves in one direction and opening communication between the cylinder and vacuum chamber when the diaphragm moves in the opposite direction, the exhaustion of air from the cylinder thru the vacuum chamber causing the piston to move under external atmospheric pressure to shift the controlled member against its retractive influence, and the admission of atmosphere to the cylinder equalizing the piston pressures and permitting the controlled member to move under its retractive influence.

5. In a control device of the character described, a cylinder, a reciprocatory piston therein operatively connected with the member to be controlled, a valve housing having a vacuum chamber therein, a movable diaphragm in said vacuum chamber, an air inlet passage leading to the chamber on one side of the diaphragm, an exhaust conduit leading from the chamber on the opposite side of the diaphragm, the portions of the chamber on the opposite sides of the diaphragm having a restricted intercommunicating port, thru which pressures on opposite sides of the diaphragm may be equalized, means for controlling the air inlet passage to the chamber, a valve connected with said diaphragm which when moved in one direction under the influence of unbalanced pressures upon the diaphragm will open communication between the cylinder and atmosphere and when permitted by the balancing of pressure upon the diaphragm to move under the influence of pressure within the cylinder will open the cylinder to the exhaust conduit.

6. The combination with a clutch control lever of an automobile, automatically retracted into engaging position, a cylinder, and a piston therein operatively connected with the lever to move said lever against its retractive influence, of a valve housing, a vacuum chamber therein a movable diaphragm within the housing, said chamber communicating with the intake manifold of the automobile motor at one side of the diaphragm and communicating with atmosphere at the opposite side of the diaphragm, the portions of the chamber at opposite sides of the diaphragm communicating one with the other thru a restricted passage, the atmospheric communication of the chamber being controlled by the fuel supply throttle connection of the automobile whereby said atmospheric communication is opened and closed automatically in unison with the adjustment of the fuel throttle, and a valve controlled by the fluctuations of the diaphragm to admit air to the cylinder in unison with admission of air to the vacuum chamber and to connect the cylinder with the intake manifold when the air supply to the vacuum chamber is interrupted by the closing of the fuel throttle means.

7. The combination with an internal combustion engine having a throttle controlled intake manifold, a clutch connecting the engine with a driven mechanism, a vacuum cylinder, a piston therein operatively connected with the clutch, an exhaust connection between the cylinder and intake manifold, said cylinder also having an air inlet port, a fluid pressure operated valve alternately connecting the cylinder with the exhaust connection, and the air inlet port, and means for controlling said valve by the adjustment of the engine throttle.

8. The combination with an internal combustion engine having a throttle controlled intake manifold, a clutch connecting the engine with a driven mechanism, vacuum operable means for operating the clutch, a connection between said means and the intake manifold of the engine, and an automatically operated valve controlling the exhaust connection by which the exhaust connection is opened to disconnect the clutch when the engine is throttled to low speed and closed upon increased speed of the engine to effect the reengagement of the clutch.

9. The combination with an internal combustion engine having a throttle controlled intake manifold, a clutch connecting the engine with a driven mechanism, a vacuum cylinder, a piston therein operatively connected with the clutch, an exhaust conduit leading from the cylinder to the intake manifold, said cylinder also having an air supply port leading thereto, a valve chamber, a reciprocatory valve, a movable diaphragm actuating said valve to alternately open and close said air inlet and exhaust ports, one side of said diaphragm being subjected to the exhaust suction thru said exhaust conduit, an air supply passage leading to the opposite side of the diaphragm, means for opening and closing said passage, and a bypass from one side of said diaphragm to the other.

10. The combination with an internal combustion engine having a throttle controlled intake manifold, a clutch connecting the engine with a driven mechanism, a vacuum cylinder, a piston therein operatively connected with the clutch, an exhaust conduit leading from the cylinder to the intake manifold, said cylinder also having an air supply port leading thereto, an automatic valve alternately opening and closing the air inlet and exhaust ports under the influence of variations of air pressure, induced by the operation of the engine.

In testimony whereof, I have hereunto set my hand this 31st day of December A. D. 1920.

HAROLD E. MOREHOUSE.

Witnesses:
GEORGE C. HELWIG,
WILLIAM A. SWANEY.